United States Patent
Nielsen

(10) Patent No.: US 9,118,214 B2
(45) Date of Patent: Aug. 25, 2015

(54) OPERATING A CONTROLLER FOR AN ENERGY PRODUCTION PLANT

(71) Applicant: Kaj Skov Nielsen, Issaquah, WA (US)

(72) Inventor: Kaj Skov Nielsen, Issaquah, WA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 64 days.

(21) Appl. No.: 13/922,366

(22) Filed: Jun. 20, 2013

(65) Prior Publication Data

US 2014/0375053 A1  Dec. 25, 2014

(51) Int. Cl.
*F03D 9/00* (2006.01)
*H02J 3/38* (2006.01)

(52) U.S. Cl.
CPC ............... *H02J 3/386* (2013.01); *F03D 9/005* (2013.01)

(58) Field of Classification Search
USPC .............. 290/44, 55; 700/286, 287, 288, 297; 415/1; 307/84
See application file for complete search history.

(56) References Cited

U.S. PATENT DOCUMENTS

| | | | |
|---|---|---|---|
| 2009/0235093 A1* | 9/2009 | Diab et al. | 713/300 |
| 2010/0025994 A1* | 2/2010 | Cardinal et al. | 290/44 |
| 2010/0094474 A1* | 4/2010 | Larsen et al. | 700/287 |
| 2011/0301769 A1* | 12/2011 | Lovmand et al. | 700/287 |
| 2013/0168963 A1* | 7/2013 | Garcia | 290/44 |
| 2014/0246857 A1* | 9/2014 | Giertz et al. | 290/44 |

FOREIGN PATENT DOCUMENTS

WO  WO 2013/060613 A1 *  5/2013

* cited by examiner

*Primary Examiner* — Julio C. Gonzalez

(57) ABSTRACT

A method is provided for operating a controller controlling an energy production plant including plural wind turbines each having an electrical output terminal connected to a common node. The method involves determining that a failure relating to the energy production plant has been overcome; receiving a first signal indicative of an actual value of an electrical quantity at the common node; receiving a second signal relating to a desired value of the electrical quantity at the common node; generating plural reference signals based on an intermediate value between the actual value and the desired value; and supplying the reference signals to the wind turbines, the reference signals controlling the wind turbines with respect to their electrical output at the output terminal such that the intermediate value of the electrical quantity at the common node is achieved.

19 Claims, 4 Drawing Sheets

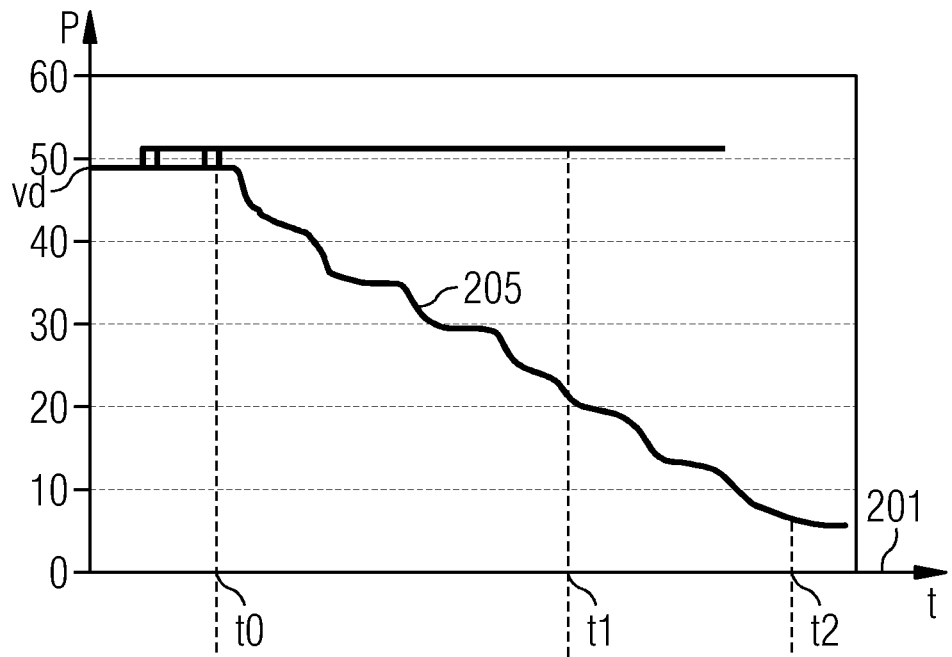
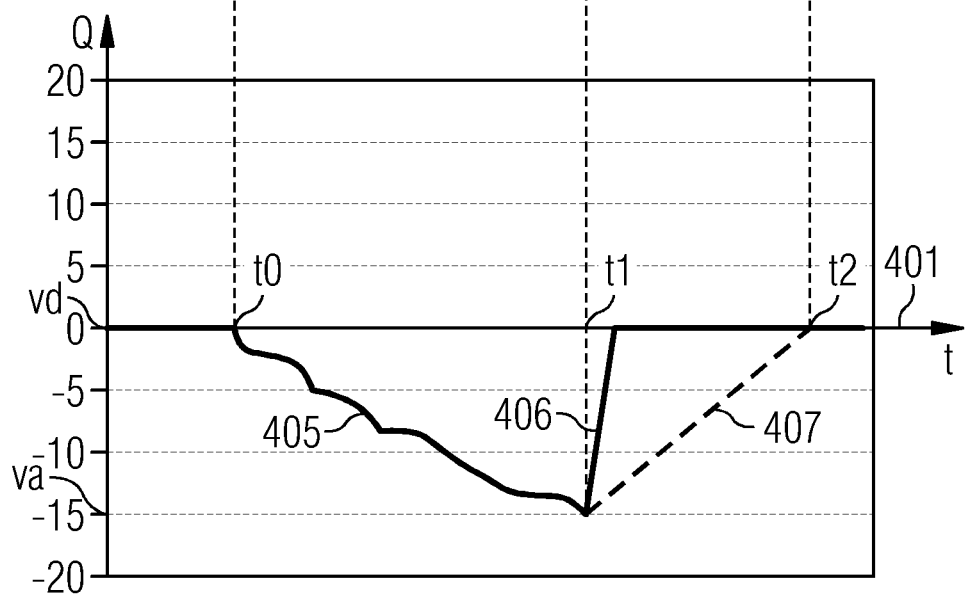

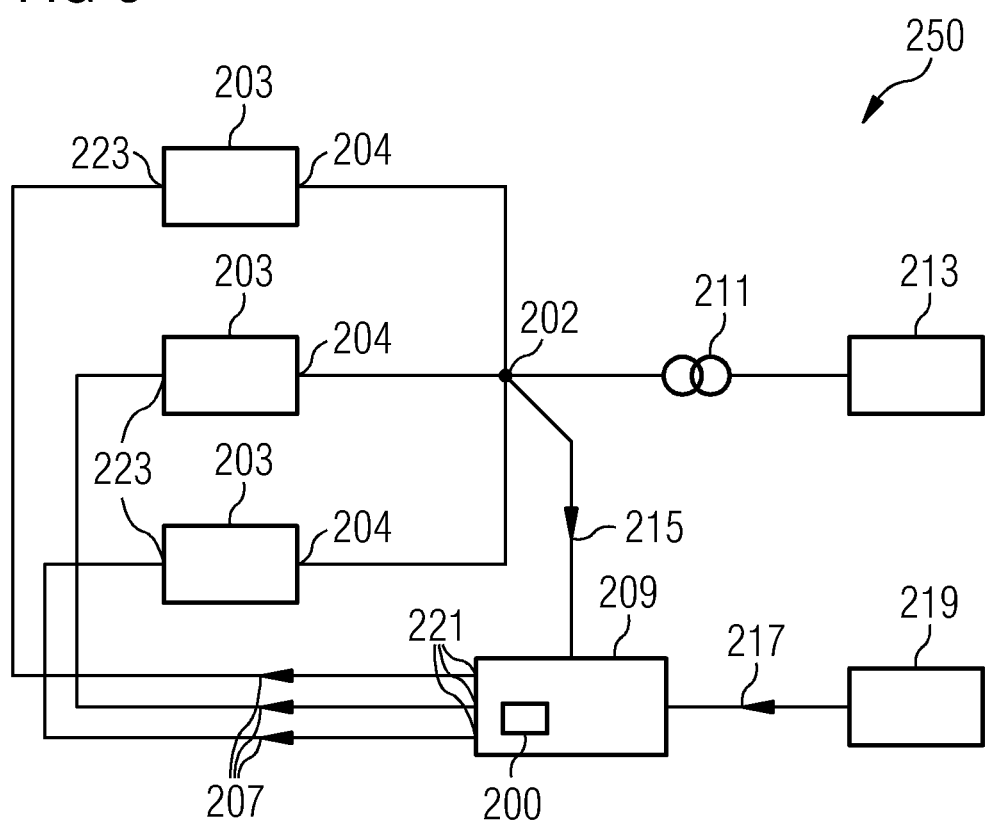

OPERATING A CONTROLLER FOR AN ENERGY PRODUCTION PLANT

FIELD OF INVENTION

The present invention relates to a method and to an arrangement of operating a controller controlling an energy production plant comprising plural wind turbines, wherein in particular a situation of recovery from a failure is addressed.

BACKGROUND OF INVENTION

During an operation of a wind energy production plant or wind park, situations or circumstances may occur where a central plant controller (in particular a controller controlling plural wind turbines comprised in the wind power plant) may have failed or where at least some essential communication(s) between the central plant controller and other equipment, such as measurement equipment or a grid operator, may have failed. In particular, it may be needed to (re)boot up the central plant controller after the failure is overcome.

The plural wind turbines may be connected to a point of common coupling or point of interconnection or common node. In a situation of a failure it may occur that during the failure power production or power consumption may change relative to these values before the failure took place. Thereby, it may occur that a reactive power step is observed at the point of common coupling, because if the production level or consumption level has changed since the last valid reference was transmitted to the turbine or if the grid operator has changed the voltage reference on the line, while the communication was disrupted, the actual value at the point of common coupling may have become different from a desired value at the point of common coupling. Thereby, a negative grid impact may be occurring which may deteriorate the stability of the grid.

There may be a need for a method and for an arrangement of operating a controller controlling an energy production plant comprising plural wind turbines, wherein a grid stability may be improved, in particular in a case of a failure or in a case of recovering from the failure.

The need is solved by the subject-matter of the independent claims. Particular embodiments of the present invention are specified in the dependent claims.

SUMMARY OF INVENTION

According to an embodiment of the present invention it is provided a method of operating a controller controlling an energy production plant comprising plural energy production entities, in particular wind turbines, each having an electrical output terminal connected to a common node. Thereby, the method comprises determining that a failure relating to the energy production plant has been overcome, receiving a first signal indicative of an actual value of an electrical quantity at the common node, receiving a second signal relating to a desired value of the electrical quantity at the common node, generating plural reference signals based on an intermediate value between the actual value and the desired value, and supplying the reference signals to the wind turbines, the reference signals controlling the wind turbines with respect to their electrical output at the output terminal such that the intermediate value of the electrical quantity at the common node is achieved.

During normal operation of the energy production plant the controller (also referred to as the central plant controller) may continuously supply or send reference values or reference signals to each of the wind turbines comprised within the energy production plant. In particular, such reference signal may be supplied to a respective converter of each wind turbine, wherein this converter may in particular be a AC-DC-AC converter adapted to convert a variable frequency AC power stream generated by a generator of the wind turbine to a DC power stream and to convert the DC power stream to a fixed frequency AC power stream which is then supplied to the common node and from there, in particular via one or more transformers, to a utility grid which supplies electric energy to a variety of consumers.

The electrical output terminal of the wind turbines may in particular be via one or more wind turbine transformers connected to the common node.

The failure may in particular be related to a failure of the controller itself and/or to a failure of communication between the controller and other equipment of the energy production plant or a grid operator. In particular, during the failure the controller may be unable to provide reference signals to the wind turbines which comply to requirements set by a grid operator, since either the controller may not be able to receive respective communication signals from the grid operator or the controller may not be able to receive information regarding the electrical properties at the point of common coupling. Other failures may occur which may hamper a normal operation of the controller and/or the entire energy production plant. Determining that the failure has been overcome may comprise identifying a situation where a communication failure has been overcome or has been fixed. Determination that the failure has been overcome may in particular comprise observing that all signals which are normally received by the controller in order to generate the reference signal are in fact received. Further, the controller may perform a self test which may determine that the controller is operating in a proper manner and is receiving all required communication signals which are essential for its proper operation.

The first signal and/or the second signal may in particular comprise an electrical and/or optical signal. The first signal may be based on a measurement of the electrical quantity from which an actual value of the electrical quantity at the common node may be derivable from.

The second signal may be received from a grid operator (or transmission operator or plant operator) which may control the properties of the utility grid and which may set required values at one or more points of the utility grid.

During normal operation (in particular when the failure has been overcome for longer than a particular time span, such as one minute to several minutes) the reference signal may be generated by the controller such that the desired value at the point of common coupling is achieved immediately or at least within a time period which is very short, such as between 0 s and 5 s. However, immediately after the failure has been overcome the reference signals are generated based on the intermediate value, thus not based on the desired value. Further, these signals are supplied to the wind turbines and control the wind turbines such that not the desired value but the intermediate value of the electrical quantity of the common node is achieved. Thereby, the method immediately after the failure has been overcome may be distinguished from a normal operation mode of the controller, since during normal operation the controller may be aimed to immediately control the wind turbines such that the desired value is achieved within a shortest period, such as a time period of 0 s and 5 s.

However, the inventor has found, that during the failure the actual value of the electrical quantity at the point of common coupling may largely differ from the desired value of the electrical quantity and that, when the wind turbines are controlled by the reference values such that the desired value of the electrical quantity is immediately achieved at the point of common coupling, the stability of the grid may be deteriorated which may lead to problems in the supply of electric energy to the consumers of the utility grid.

By smoothly approaching the desired value starting from the actual value of the electrical quantity the stability of the grid may be improved.

According to an embodiment of the present invention the method further comprises identifying what kind of failure has been overcome; and generating the plural reference signals based on the intermediate value which has been determined based on the kind of failure overcome.

Thereby it is enabled to differentiate the response for different kinds of failures. Thereby for each kind of failure an appropriate response (e.g. time course of intermediate value) may be applied.

According to an embodiment of the present invention the method further comprises generating temporally varying plural reference signals corresponding to temporally changing the intermediate value from the actual value to the desired value.

Temporally varying the plural reference signals may be performed across a time interval between 10 s and 120 s, in particular between 10 s and 60 s for example. Thereby, a cautious approaching from the actual value to the desired value may be achieved, in particular avoiding (or at least reducing) jump-like changes of the reference signals. By avoiding jump-like changes (or at least reducing their step size) of the reference signals also the operation of the wind turbine may be improved, since a jump-like change of the reference signal supplied the wind turbine may cause excitation of several oscillation modes in electrical and/or mechanical components of the wind turbine, such as within the converter, within the generator and/or within the rotation shaft of the wind turbine at which plural rotor blades are connected.

According to an embodiment of the present invention the intermediate value changes temporally in a continuous manner, in particular linear manner between the actual value and the desired value.

The continuous manner may in particular be distinguished from a stepwise manner, where a change takes place at a particular time point changing from a first value to a second value different from the first value. The continuous manner may in particular be characterized by a gradual change of the value. Mathematically speaking a function defining the course of the intermediate value may be differentiable at all points which would not be the case, if there is a jump in the time course of the intermediate value. Thereby, operation of the wind turbines and the entire energy production plant may further be proved, in particular regarding electrical stability.

According to an embodiment of the present invention changing the intermediate value occurs according to a slope that has an absolute value less than a predetermined slope threshold.

The slope may be a negative slope or a positive slope. The predetermined slope threshold may be derived based on components of the power production plant, such as properties of the wind turbines, in particular regarding their electrical properties. The predetermined slope threshold may be adjusted or selected such that damage of components of the wind turbines may be avoided or reduced. Further, the predetermined slope threshold may be set such that the stability of the utility grid is not deteriorated to an excess extend, while at the same time also addressing the goal to achieve the desired value at the common node as fast as possible. Thus, setting the predetermined slope threshold or also setting the intermediate value or the temporally changing the intermediate value may take into account on one hand the stability of the grid and on the other hand to achieve the desired value of the point of common coupling in a relatively fast manner. Thus, a compromise between grid stability and achievement of desired values may be found.

According to an embodiment of the present invention determining that failure has been overcome comprises monitoring a first time point at which the failure has been overcome, wherein the method is only performed until a second time point, wherein the second time point is a predetermined time interval later than the first time point or wherein the second time point is, when the intermediate value has been changed to be equal to the desired value.

In particular, the first time point may be recorded and stored for example in an electronic storage. The second time point may be, for example, determined based on the consideration to improve the grid stability and also the consideration to achieve the desired value at the common node as fast as possible. Thereby, the method may be simplified, since in particular after the second time point a normal operation node of the controller may be resumed.

According to an embodiment of the present invention changing the intermediate value from the actual value to the desired value is performed within the predetermined time interval after the first time point, the predetermined time interval being in particular between 1 s and 120 s, further in particular between 10 s and 60 s.

The predetermined time interval may be considerably larger than the normal operation time interval within which the desired value received is utilized in order to generate the plural reference signals to be sent to the wind turbines. Thereby, smoothly approaching the desired value starting from the actual value may be achieved, in particular avoiding at least some of the oscillations occurring in conventional systems or controllers.

According to an embodiment of the present invention the intermediate value differs from the desired value at a time point after a first half of the predetermined time interval after the first time point between 0.4 and 0.6 of the difference between the actual value and the desired value.

Thereby, it may be avoided that the intermediate value equals to the desired value within the first half of the predetermined time interval, in order to reduce excitation of oscillations.

According to an embodiment of the present invention the method comprising after the second time point: receiving another second signal relating to another desired value of the electrical quantity at the common node; generating plural reference signals based on the other desired value; supplying, within another predetermined time interval smaller than the predetermined time interval, the plural reference signals to the plural wind turbines, wherein in particular the other predetermined time interval is between 0 s and 20 s, further in particular between 0 s and 3 s.

In particular, after the second time point a normal operation mode of the controller may be entered which is or which may be different from the operation mode performed immediately after the failure has been overcome.

In this normal operation mode the plural reference signals may not be based on an intermediate value anymore, but may be based on the other desired value, such that the other desired value is actually achieved at the common node immediately or at least within the other predetermined time interval which is considerably smaller than the predetermined time interval. Thereby, the desired value may be achieved as fast as possible to during the normal operation mode.

In particular, it has been observed that during normal operation the desired value received from the grid operator, for example, may not significantly differ from the actual value at the common node such that by applying the reference signals based on the desired value the risk of exciting oscillations is not as high as after a failure has overcome, where a difference between the desired value and the actual value may be much greater.

According to an embodiment of the present invention the electrical quantity comprises reactive power and/or voltage and/or power factor and/or active power.

In particular, it may be less important to take into account active power and it may be particularly important to take into account the reactive power, the voltage and/or the power factor. Thereby, important electrical quantities at the common node may be taken into account from which one or more may be required to appropriately calculate the reference signals to be sent to the wind turbines.

Some electrical quantities may be related to each other may not be set independently from each other. E.g. a voltage reference Uref may indirectly dictate reactive power Q.

A reactive power ref Qref may indirectly dictate a cos φ etc.

In particular the electrical quantity used in the method may depend on what type of mode of operation or control is selected.

According to an embodiment of the present invention the actual value differs from the desired value by between 5 times and 1000 times of an allowed deviation defined by a grid operator for operating the utility grid according to a normal operation, in particular due to an energy production change and/or an energy consumption change.

Thereby, the method may handle a large set of circumstances occurring when a failure has been overcome.

According to an embodiment of the present invention the first signal is related to a measurement performed at a location between the common node and a high voltage side of a plant transformer.

In particular, the measurement may be performed at the common node, at a low voltage side of a park transformer, at a high voltage side of a park transformer, for example. The target value may e.g. be a measurement value corrected for a line loss to a point of simulated measurement.

The measurement value may be transmitted via a wire-based or wireless communication technology, in particular comprising electrical and/or optical signals to the controller.

According to an embodiment of the present invention the second signal is received from a grid operator or a plant controller.

The grid operator may define properties of the grid and may derive therefrom the second signal which may be communicated to the controller of the energy production plant. The grid operator may for example define a voltage level, a reactive power, a power factor and an active power at the point of common coupling. The controller of the energy production plant may in turn be responsible to operate the wind turbines such that the electrical properties as set by the grid operator are achieved at the common node without deteriorating stability of the components and in particular the stability of the grid and without hampering or damaging the component of the energy production plant.

According to an embodiment of the present invention the failure comprises: plant controller failure and/or plant controller shutdown and/or plant controller update operation and/or communication failure between plant controller and the plural wind turbines and/or between measurement equipment and the plant controller and/or supply interruption, wherein the method is in particular performed during reboot, in particular auto-reboot of the plant controller.

The method may further comprise indentifying a kind of failure; and selecting a dedicated ramping function for the identified failure.

In particular, method may be performed depending on a recovery method (such as start up or update etc) and/or the type of failure overcome. In particular the temporal manner in which the actual value approaches the desired value may depend on the recovery method and/or the type of failure overcome. The method may e.g. include a different set of parameters for a boot up sequence compared to a loss of communication or a switch over to a hot stand by controller.

Thereby, a large class of failure types may be accounted for. Other failure types may be possible.

It should be understood that features individually or in any combination disclosed, described, mentioned or applied to a method of controlling a or a method of operating a controller controlling an energy production plant may also be individually or in any combination applied to, used for or provided for an arrangement for a controller controlling an energy production plant according to an embodiment of the present invention and vice versa.

According to an embodiment of the present invention it is provided an energy production plant (such as a tidal plant or a wave plant or solar plant or wind plant or any other plant, even a virtual power plant incorporating a gas or storage system, consisting of multiple production devices/entities in particular distributed over a large area and depending on a central control system) comprising plural energy production entities, in particular wind turbines each having an electrical output terminal connected to a common node, the arrangement comprising: a processor for determining that a failure relating to the energy production plant has been overcome; a receiving section for receiving a first signal indicative of an actual value of an electrical quantity at the common node, and for receiving a second signal relating to a desired value of the electrical quantity at the common node; the processor further being adapted for generating plural reference signals based on an intermediate value between the actual value and the desired value; and at least one output port for supplying the reference signals to the wind turbines, the reference signals controlling the wind turbines with respect to their electrical output at the output terminal such that the intermediate value of the electrical quantity at the common node is achieved.

The arrangement may in particular be adapted to perform a method according to an embodiment of the present invention.

Embodiments of the present invention are now described with reference to the accompanying drawings. The invention is not restricted or limited to the illustrated or described embodiments.

BRIEF DESCRIPTION OF THE DRAWINGS

FIG. 2 illustrates a graph considered in a method of operating a controller according to an embodiment of the present invention;

FIG. 4 illustrates a graph according to which an intermediate value of reactive power is derived in a method of operating a controller according to an embodiment of the present invention;

FIG. 6 schematically illustrates an energy production plant comprising an arrangement for a controller according to an embodiment of the present invention.

DETAILED DESCRIPTION OF INVENTION

Figure 1:
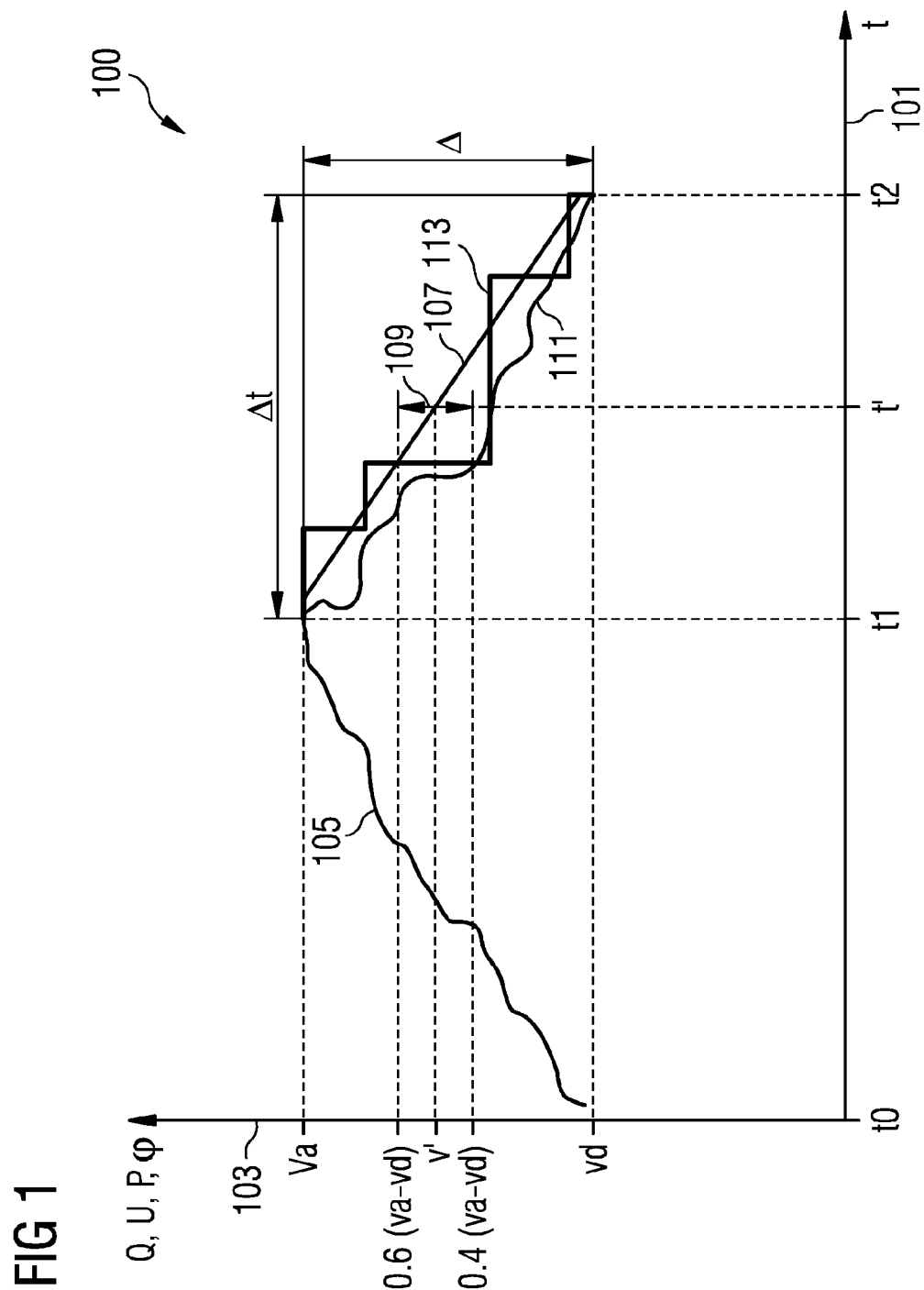
FIG. 1 illustrates a graph according to which an intermediate value is derived in a method of operating a controller according to an embodiment of the present invention.

FIG. 1 illustrates a graph considered in a method of operating a controller according to an embodiment of the present invention. On an abscissa 101 the time t is indicated, while on an ordinate 103 the reactive power Q, the voltage U, the active power P, or the power factor $\phi$ or $\cos(\phi)$ are indicated. The method may be applied for controlling the reactive power Q and/or the voltage U and/or the active power P and/or the power factor $\phi$. At a time point t0 a failure occurs, while the desired value, of e.g. the reactive power, vd is received as a signal (signal 217 in FIG. 2), e.g. from a grid operator (such as grid operator 219 in FIG. 2). The failure takes place between the time points t0 and t1. During the time interval between t0 and t1 the actual value (such as measured at the common node 202 in FIG. 2) changes according to the curve 105 which reaches the actual value va at the first time point t1. In particular, the actual value va may be received from a measurement equipment measuring for example the reactive power Q, the voltage U, the active power P and/or the power factor $\phi$ at a point of common coupling, such as the point of common coupling 202 illustrated in FIG. 2, at which plural wind turbines 203 are connected.

At the first time point t1 it is determined that the failure has been overcome, for example by fixing the controller or fixing a communication problem. As can be seen from FIG. 1 (assuming that the desired value vd stayed constant) the difference between the actual value va and the desired value vd amounts to $\Delta$. $\Delta$ may for example be 50 to 60 MVAR, for example. The control method or operation method generates an intermediate value v' described by the curve 107 which temporary varies from the actual value va to the desired value vd within a predetermined time interval $\Delta t$. Thereby, the time interval $\Delta t$ may for example amount to between 10 s and 60 s. At a time point t' which is a time point after a first half of the predetermined time interval $\Delta t$ after the first time point t1 the intermediate value v' ranges within a range 109 which is defined by the limits 0.4 (va-vd) and the other limit 0.6 (va-vd).

The slope $\Delta/\Delta t$ may have an absolute value less than a predetermined slope threshold.

FIGS. 2, 3, 4, and 5 illustrate other graphs how an actual value va of an electrical quantity (active power P in FIGS. 2 and 3; reactive power Q in FIGS. 4 and 5) is controlled to approach the respective desired value vd. Thereby, FIG. 2 illustrates active power P, and FIG. 4 the associated reactive power Q, also indicated are the times t0, t1, t2.

Figure 3:
FIG. 3 illustrates a graph according to which an intermediate value of active power is derived in a method of operating a controller according to an embodiment of the present invention.
Figure 5:
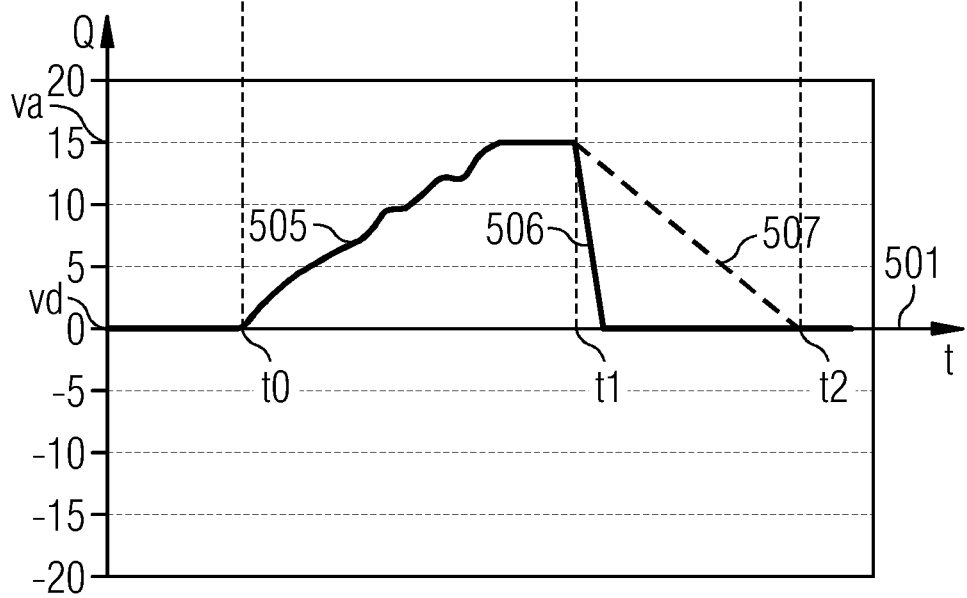
FIG. 5 illustrates a graph according to which an intermediate value of reactive power is derived in a method of operating a controller according to an embodiment of the present invention.

FIG. 3 illustrates active power P and FIG. 5 the associated reactive power Q. The vertical lines at times t0, t1, t2 represent the (temporal) correlation between the pairs of plots.

Abscissas 201, 301, 401, 501 indicate time, the ordinate in FIG. 2, 3 represents active power P, the ordinate in FIG. 4, 5 represents reactive power Q. Curves or elements/points which are similar to the one in FIG. 1 are denoted with reference signs differing only in the first digit.

Active power P changes (increases in the illustrated example of FIG. 3) from the actual value va in a linear manner to the desired value vd according to curve 307.

Reactive power Q changes (increases in the illustrated example of FIG. 4) from the actual value va in a linear manner to the desired value vd according to curve 407 or 406 having different slopes.

Reactive power Q changes (decreases in the illustrated example of FIG. 5) from the actual value va in a linear manner to the desired value vd according to curve 507 or 506 having different slopes.

FIG. 6 schematically illustrates an energy production plant 250 comprising plural wind turbines 203 each having an output terminal 204 which is connected to a common node 202. The wind turbines 203 are receiving reference signals 207 from a plant controller 209 which comprises an arrangement 200 for the controller 209 according to an embodiment of the present invention. The common node 201 is connected via a plant transformer 211 to a utility grid 213 providing electric energy to plural consumers.

The controller 209 and thus also the arrangement 200 receives a first signal 215 which is indicative of an actual value (such as va as illustrated in FIG. 1) of an electrical quantity (such as reactive power, active power, voltage or power factor) at the common node 202. The first signal 215 may be for example based on a measurement of the electrical quantity at the point of common coupling 202 or common node 202.

Further, the controller 209 and also the arrangement 200 receives a second signal 217 which is related to a desired value vd of the electrical quantity at the common node, wherein the second signal is received from a grid operator 219 in the illustrated embodiment. The second signal 217 may, however, be received from another entity or component. The arrangement 200 is adapted for generating plural reference signals 207 based on an intermediate value (such as intermediate value v' as illustrated in FIG. 1), wherein the intermediate value v' lies between the actual value va and the desired value vd.

The plural reference signals 207 are supplied to the wind turbines 203 via output ports 221 of the controller 209. In particular, the plural reference signals 207 are received at control input terminals 223 of the wind turbines 203, which may for example be converter control input terminals of respective AC-DC-AC converters. Based on the plural reference signals 207 the respective converters may control a torque of a rotation shaft at which plural rotor blades are connected, such that the wind turbines 203 output particular power streams which result in the intermediate value v' of the electrical quantity at the point of common coupling 202.

In particular, the arrangement 200 may perform a voltage control. In particular, on boot-up, for example at the first time point t1, the arrangement 200 may measure the actual reactive contribution Q at the first time point t1. Further, the arrangement may calculate the desired steady state level, for example based on the second signal 217. Further, the arrangement 200 may ramp between the two values during a predefined time period, such as the time period $\Delta t$. This time period may for example be set to 10 to 60 s.

Further, the arrangement 200 may perform a reactive power control (MVAr control). Thereby, the respective MVAr controller within the arrangement 200 or within the controller 209 may measure the actual reactive contribution Q at the time of boot-up or at the first time point t1. Further, the desired steady state MVAr level may be calculated and it may be ramped between the two values between the predetermined time period.

Further, the controller 209 or the arrangement 200 may perform a cos(φ) control, wherein a respective cos(φ) controller may measure the actual reactive contribution or the actual power factor at the first time point t1, in particular occurring at boot-up. Further, the desired steady state MVAR-level may be calculated and may be ramped between the two values during the time period.

Furthermore, the controller 209 or the arrangement 200 may perform an active power control, wherein a MW-controller may measure the actual active power contribution P at the time of boot-up or at the first time point t1. Further, the desired steady state MW-level may be calculated and it may be ramped between the two values during the predetermined time period.

In particular, the arrangement 200 may comprise a small software function which may be stored in an electronic storage.

It is possible to operate the plant in voltage control and issue a reactive power ref Qref to the turbine. It is possible to operate the plant in voltage control and issue cos φ ref to the turbines. Likewise it is possible to operate the plant in Q mode and issue other than Q references to the turbines to active the desired Voltage value.

Implementing a boot-up function, such as defined according to a method according to an embodiment of the present invention or as implemented in the arrangement 200 may improve the grid stability related to different failure modes for the central plant controller 209, wherein a boot-up or resumption of normal operation of the controller 209 may be needed for any reason.

The implementation of the operation method according to an embodiment of the present invention may include separate hardware measuring from dedicated transducers or it can be configured as separate hardware measuring on shared transducers. Another configuration could be shared hardware but parallel instances of the control software running on the same hardware. A further option could be three instances being compared for automatic detection of an outer layer and a warning to service crews that there is a potential redundancy failure or an automatic change over to the one of the two remaining plant control systems.

Further, the operating method or boot-up function could also be applied during handover of control to a hot stand by controller to ensure a reduced bump during transition.

Further, the boot-up function or the operation method may be located in an external control device.

Further, the boot-up function or the operating method may have separate ramp times for each of the regulators, for example a particular reactive power predetermined time interval, an active power predetermined time interval, a voltage predetermined time interval and a power factor predetermined time interval.

The operating method or the boot-up function for the voltage controller could calculate the actual voltage droop at the time of boot-up (for example the first time point t1) and could ramp the droop setting during the boot-up ramp period.

Further, the operating method or the boot-up function may ramp in a linear manner, but could also be according to any other function or according to a series of steps. For example, the ramping could be performed according to the curve 111 as is illustrated in FIG. 1 or could also be performed according to the step curve 113 as illustrated in FIG. 1. Other curves may be possible.

The actual value va may be e.g. measured at the point 202 and the desired value vd from the utility may e.g. be measured at point 213, in which case the controller 209 may compensate for the difference between the two measurement points 202 and 213. (Line loss compensation). Other measurement points are possible.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method of operating a controller controlling an energy production plant comprising a plurality of wind turbines, each having an electrical output terminal connected to a common node, the method comprising:
   determining that a failure relating to the energy production plant has been overcome;
   receiving a first signal indicative of an actual value of an electrical quantity at the common node;
   receiving a second signal relating to a desired value of the electrical quantity at the common node;
   generating a plurality of reference signals based on an intermediate value between the actual value and the desired value; and
   supplying the reference signals to the wind turbines, the reference signals controlling the wind turbines with respect to their electrical output at the output terminal such that the intermediate value of the electrical quantity at the common node is achieved.

2. The method according to claim 1, further comprising:
   identifying what kind of failure has been overcome;
   generating the plurality of reference signals based on the intermediate value which has been determined based on the kind of failure overcome.

3. The method according to claim 1, further comprising:
   generating temporally varying plurality of reference signals corresponding to temporally changing the intermediate value from the actual value to the desired value.

4. The method according to claim 3, wherein the intermediate value changes temporally in a continuous or stepwise manner, or linear manner between the actual value and the desired value.

5. The method according to claim 3, wherein changing the intermediate value occurs according to a slope that has an absolute value less than a predetermined slope threshold.

6. The method according to claim 3, wherein determining that failure has been overcome comprises monitoring a first time point at which the failure has been overcome, wherein the method is only performed until a second time point,
   wherein the second time point is a predetermined time interval later than the first time point, or
   wherein the second time point is, when the intermediate value has been changed to be equal to the desired value.

7. The method according to claim 6, wherein changing the intermediate value from the actual value to the desired value is performed within the predetermined time interval after the first time point.

8. The method according to claim 7, wherein the predetermined time interval is between 1 s and 120 s.

9. The method according to claim 7, wherein the intermediate value differs from the desired value at a time point after a first half of the predetermined time interval after the first time point between 0.4 and 0.6 of the difference between the actual value and the desired value.

10. The method according to claim 7, further comprising after the second time point:
   receiving another second signal relating to another desired value of the electrical quantity at the common node;

generating plural reference signals based on the other desired value;

supplying, within another predetermined time interval smaller than the predetermined time interval, the plurality of reference signals to the plurality of wind turbines.

11. The method according to claim 10, wherein said another predetermined time interval is between 0 s and 20 s.

12. The method according to claim 1, wherein the electrical quantity comprises reactive power and/or voltage and/or power factor and/or active power.

13. The method according to claim 1, wherein
the actual value differs from the desired value by between 5 times and 1000 times of an allowed deviation defined by a grid operator for operating the utility grid according to a normal operation.

14. The method according to claim 13, said difference between the actual value and the desired value occurs at said first time point.

15. The method according to claim 1, wherein the first signal is related to a measurement performed at a location between the common node and a high voltage side of a plant transformer.

16. The method according to claim 1, wherein the second signal is received from a grid operator or a plant controller.

17. The method according to claim 1, wherein the failure comprises:
plant controller failure and/or
plant controller shutdown and/or
plant controller update operation and/or
communication failure
between plant controller and the plural wind turbines and/or
between measurement equipment and the plant controller and/or
supply interruption,
the method further comprising:
indentifying a kind of failure; and
selecting a dedicated ramping function for the identified failure.

18. The method according to claim 17, wherein the method is performed during reboot, in particular auto-reboot of the plant controller.

19. An arrangement for a controller controlling an energy production plant comprising a plurality of wind turbines, each having an electrical output terminal connected to a common node, the arrangement comprising:
a processor for determining that a failure relating to the energy production plant has been overcome;
a receiving section:
for receiving a first signal indicative of an actual value of an electrical quantity at the common node; and
for receiving a second signal relating to a desired value of the electrical quantity at the common node;
the processor further being adapted for generating plural reference signals based on an intermediate value between the actual value and the desired value; and
at least one output port for supplying the reference signals to the wind turbines, the reference signals controlling the wind turbines with respect to their electrical output at the output terminal such that the intermediate value of the electrical quantity at the common node is achieved.

* * * * *